United States Patent
Yoshikawa

(10) Patent No.: US 10,023,149 B2
(45) Date of Patent: Jul. 17, 2018

(54) VEHICLE OCCUPANT PROTECTION DEVICE

(71) Applicant: Fuji Jukogyo Kabushiki Kaisha, Tokyo (JP)

(72) Inventor: Mitsuharu Yoshikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/261,604

(22) Filed: Sep. 9, 2016

(65) Prior Publication Data
US 2017/0088085 A1   Mar. 30, 2017

(30) Foreign Application Priority Data

Sep. 30, 2015 (JP) .................. 2015-194732

(51) Int. Cl.
  *B60R 21/232* (2011.01)
  *B60R 21/233* (2006.01)
  (Continued)

(52) U.S. Cl.
  CPC ........ *B60R 21/233* (2013.01); *B60R 21/0134* (2013.01); *B60R 21/0136* (2013.01); *B60R 21/205* (2013.01); *B60R 21/213* (2013.01); *B60R 21/232* (2013.01); *B60R 21/23138* (2013.01); *B60R 2021/0048* (2013.01); *B60R 2021/23107* (2013.01)

(58) Field of Classification Search
  CPC ............ B60R 21/232; B60R 21/23138; B60R 21/231; B60R 21/2338; B60R 21/237; B60R 21/213; B60R 2021/23384; B60R 2021/23382; B60R 2021/0048

USPC ................. 280/730.2, 743.1, 743.2
See application file for complete search history.

(56) References Cited

U.S. PATENT DOCUMENTS

| | | | |
|---|---|---|---|
| 9,469,269 B2* | 10/2016 | Hiruta | B60R 21/232 |
| 2008/0129023 A1* | 6/2008 | Heigl | B60R 21/232 |
| | | | 280/730.1 |

(Continued)

FOREIGN PATENT DOCUMENTS

| | | |
|---|---|---|
| JP | 2014-37159 A | 2/2014 |
| JP | 2014-151676 A | 8/2014 |
| WO | WO 2012/111073 A1 | 8/2012 |

OTHER PUBLICATIONS

JPO Decision to Grant dated Dec. 6, 2016, with an English translation thereof.

(Continued)

*Primary Examiner* — Keith J Frisby
(74) *Attorney, Agent, or Firm* — McGinn IP Law Group, PLLC

(57) ABSTRACT

A vehicle occupant protection device includes a front airbag and a lateral airbag. The front airbag is provided in a vehicle body and deploys in front of an occupant boarding the vehicle body so that at least a head of the occupant hits against the front airbag. The lateral airbag is provided in the vehicle body so as to deploy at a lateral side of the occupant. The lateral airbag has a protrusion that deploys toward a middle of the vehicle body in a width direction. The protrusion is deployed together with the front airbag so that the head of the occupant hitting against the front airbag is supported from front and lateral sides.

10 Claims, 3 Drawing Sheets

(51) Int. Cl.
*B60R 21/0134* (2006.01)
*B60R 21/0136* (2006.01)
*B60R 21/205* (2011.01)
*B60R 21/213* (2011.01)
*B60R 21/231* (2011.01)
*B60R 21/00* (2006.01)

(56) References Cited

U.S. PATENT DOCUMENTS

| | | | |
|---|---|---|---|
| 2014/0203541 A1* | 7/2014 | Wei | B60R 21/213 |
| | | | 280/730.2 |
| 2016/0221527 A1* | 8/2016 | Sugimori | B60R 21/232 |
| 2016/0280178 A1* | 9/2016 | Kruse | B60R 21/232 |
| 2016/0288762 A1* | 10/2016 | Deng | B60R 21/0136 |
| 2017/0151925 A1* | 6/2017 | Kim | B60R 21/232 |

OTHER PUBLICATIONS

JPO Notfication of Refusal dated Sep. 13, 2016, with an English translation thereof.
Japanese Office Action dated Sep. 13, 2016 with an English translation thereof.

* cited by examiner

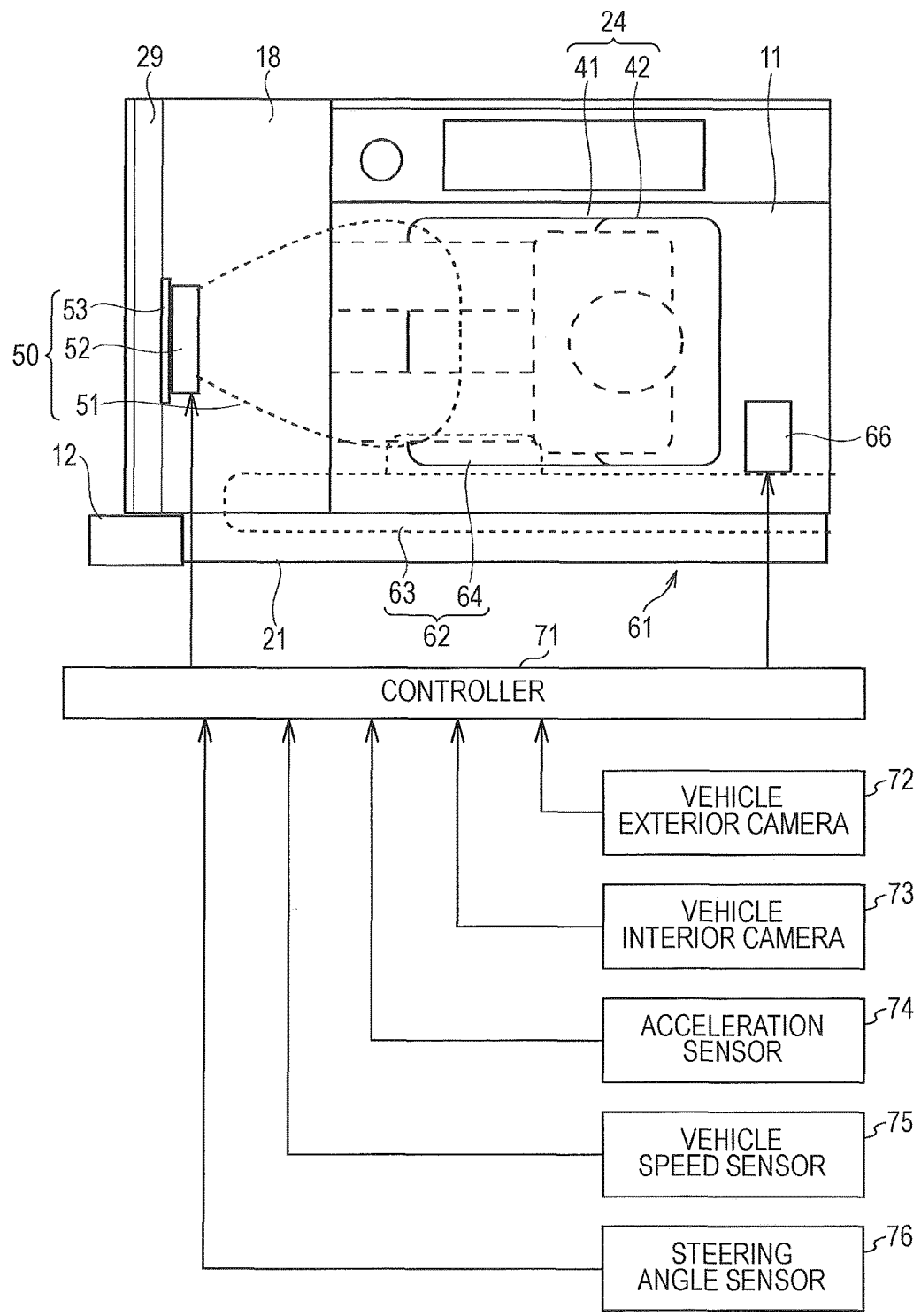

VEHICLE OCCUPANT PROTECTION DEVICE

CROSS-REFERENCE TO RELATED APPLICATIONS

The present application claims priority from Japanese Patent Application No. 2015-194732 filed on Sep. 30, 2015, the entire contents of which are hereby incorporated by reference.

BACKGROUND

1. Technical Field

The present invention relates to vehicle occupant protection devices.

2. Related Art

Vehicles, such as automobiles, are provided with various types of vehicle occupant protection devices.

For instance, Japanese Unexamined Patent Application Publication No. 2014-151676 discloses a front airbag that is to be deployed at the front side of an occupant seated in a seat and also discloses a curtain airbag that is to be deployed at an outer side of the occupant.

Thus, for instance, when the automobile collides with another automobile, the front airbag is deployed at the front side of the occupant seated in the seat so that the occupant falling forward against the deployed front airbag can be supported, thereby protecting the occupant.

However, even when the front airbag is deployed in the vehicle in this manner, if the occupant falls diagonally forward, for instance, there is a possibility that the occupant's head, after hitting against the front airbag, may move and drop beside the front airbag. This may possibly cause the head to rotate.

Accordingly, in a vehicle occupant protection device, it is demanded that such rotation of the occupant's head after hitting against the airbag be suppressed.

SUMMARY OF THE INVENTION

An aspect of the present invention provides a vehicle occupant protection device including a front airbag and a lateral airbag. The front airbag is provided in a vehicle body and deploys in front of an occupant boarding the vehicle body so that at least a head of the occupant hits against the front airbag. The lateral airbag is provided in the vehicle body so as to deploy at a lateral side of the occupant. The lateral airbag has a protrusion that deploys toward a middle of the vehicle body in a width direction. The protrusion is deployed together with the front airbag so that the head of the occupant hitting against the front airbag is supported from front and lateral sides.

The vehicle occupant protection device may further include a controller that controls deployment of the lateral airbag. The controller may determine a type of collision based on at least one of input information to be used for predicting the type of collision, input information at a time of a collision, and input information indicating a vehicle interior condition, determine whether deployment of the protrusion is necessary based on a determination result of the type of collision, and cause the lateral airbag to deploy if the deployment of the protrusion is necessary.

When determining the type of collision, the controller may determine at least one of a degree of matching between a deployment direction of the front airbag and an impact input direction, a degree of matching between a falling direction of the occupant caused by an impact and the deployment direction of the front airbag, magnitude of an impact value, either one of presence and absence of the occupant, magnitude of either one of physique and body weight of the occupant, and a distance between the occupant and an interior component of the vehicle body.

The controller may cause the lateral airbag to deploy earlier than the front airbag at a time of a collision prediction.

If an impact is received obliquely from a front side, the controller may cause the front airbag and the lateral airbag to deploy.

The protrusion may deploy to a position located closer toward the middle of the vehicle body relative to an outer edge of the front airbag in a deployed state.

The protrusion may deploy at an outer side of the front airbag and come into contact with the front airbag.

The protrusion may have a front section that comes into contact with the front airbag in a deployed state and may also have a rear section that is located to the rear of the front section and extends rearward than the front airbag.

The lateral airbag may be either one of a curtain airbag and a side airbag provided in the vehicle body.

BRIEF DESCRIPTION OF THE DRAWINGS

FIG. 2 illustrates the vehicle occupant protection device according to the example.

DETAILED DESCRIPTION

An example of the present invention will be described below with reference to the drawings.

Figure 1A:
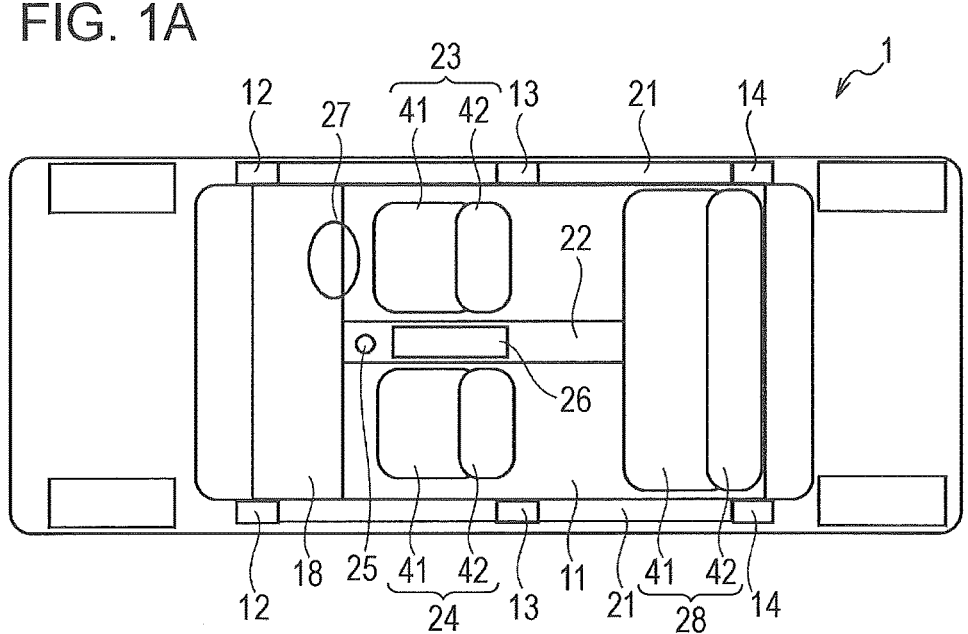
FIGS. 1A and 1B schematically illustrate the structure of an automobile to which a vehicle occupant protection device according to an example of the present invention is applied.
Figure 1B:
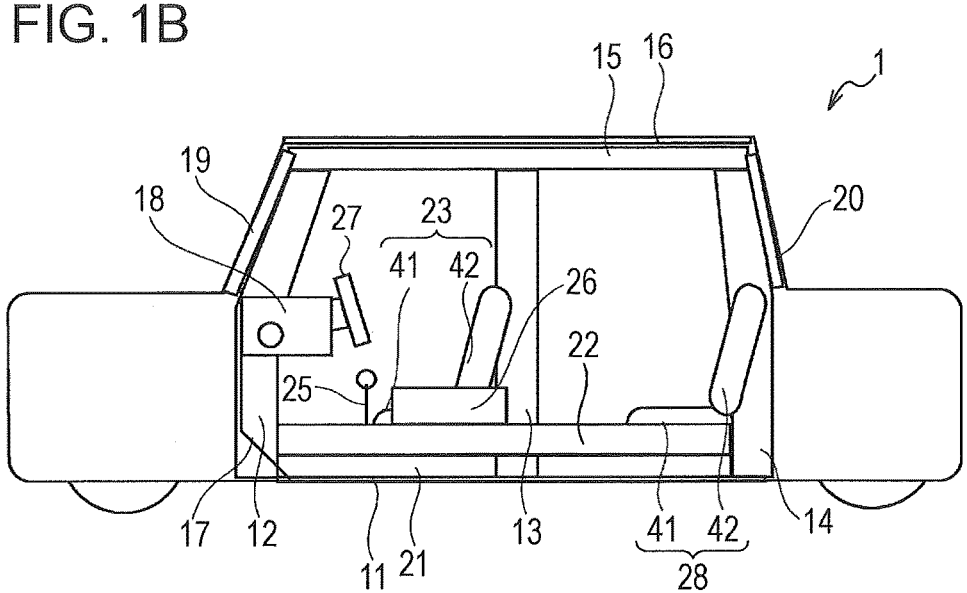

FIGS. 1A and 1B schematically illustrate the structure of an automobile 1 to which a vehicle occupant protection device according to an example of the present invention is applied.

The automobile 1 is a type of a vehicle. The middle of the vehicle body of the automobile 1 in the front-rear direction is provided with an occupant compartment that one or more occupants board. The front of the vehicle body is provided with a front chamber for disposing, for instance, a fuel engine therein. The rear of the vehicle body is provided with a rear chamber that can be used as, for instance, a trunk.

The occupant compartment has a substantially rectangular floor panel 11, a pair of A pillars 12 standing upright from the front corners of the floor panel 11, a pair of B pillars 13 standing upright from the middle of the floor panel 11 in the front-rear direction, and a pair of C pillars 14 standing upright from the rear corners of the floor panel 11. The upper ends of the A pillars 12 and the upper ends of the C pillars 14 are coupled by means of roof rails 15. The upper end of each B pillar 13 is joined to the middle of the corresponding roof rail 15 in the front-rear direction. A substantially rectangular roof panel 16 is joined between the pair of left and right roof rails 15.

A toeboard 17 is disposed between the front edge of the floor panel 11 and the lower sections of the pair of A pillars 12, and a dashboard 18 is disposed above the toeboard 17. A front windshield 19 is fitted so as to be surrounded by the dashboard 18, the upper sections of the pair of A pillars 12, and the front edge of the roof panel 16. A rear glass window 20 is fitted between the upper sections of the pair of C pillars 14.

Front doors rotatably supported by the A pillars 12 are disposed between the A pillars 12 and the B pillars 13 arranged in the front-rear direction. Rear doors rotatably supported by the B pillars 13 are disposed between the B pillars 13 and the C pillars 14. A pair of side sills 21 are respectively joined to the left and right widthwise edges of the floor panel 11.

Accordingly, the occupant compartment of the automobile 1 is a box-type space having a substantially cubic shape.

The middle of the floor panel 11 in the left-right direction is provided with a center tunnel 22 that extends in the front-rear direction so as to protrude into the occupant compartment. For instance, a drive shaft for transmitting a driving force of the fuel engine to the rear wheels is disposed below the center tunnel 22.

As front seats, a driver seat 23 on which a driver sits and a navigation seat 24 on which a navigator sits are attached side-by-side in the left-right direction at the front section of the floor panel 11. The driver seat 23 has a seat part 41 and a backrest part 42. The navigation seat 24 also has a seat part 41 and a backrest part 42. The center tunnel 22 is located between the seat part 41 of the driver seat 23 and the seat part 41 of the navigation seat 24. A shift lever 25, a parking brake lever, a console box 26 serving as an interior component, and so on are attached above the center tunnel 22.

The dashboard 18 extending in the left-right direction is located in front of the driver seat 23 and the navigation seat 24. A steering wheel 27 protruding rearward from the dashboard 18 is located in front of the driver seat 23.

A bench seat 28 on which a plurality of occupants can be seated is attached as a rear seat to the rear section of the floor panel 11. The bench seat 28 has a seat part 41 and a backrest part 42. The bench seat 28 has a width, in the left-right direction, equal to that of the floor panel 11. Normally, up to three occupants can be seated on the bench seat 28.

In the automobile 1, the vehicle occupant protection device is used for protecting each occupant in the event of a collision.

FIG. 2 illustrates the vehicle occupant protection device according to the example.

The vehicle occupant protection device has a front airbag module 50, a curtain airbag module 61, and a controller 71.

The front airbag module 50 has a front airbag 51, an inflator 52, and a module base 53.

The front airbag 51 is formed by, for instance, sewing a fabric in the form of a bag having a substantially cubic shape.

The inflator 52 is a small tank that contains gunpowder and high-pressure gas. The inflator 52 is coupled to the front airbag 51.

The module base 53 is, for instance, a metallic plate. The front airbag 51 and the inflator 52 are fixed to the module base 53.

Furthermore, the module base 53 is fixed to a steering support beam 29 within the dashboard 18. The module base 53 is fixed facing rearward at a position located in front of the navigation seat 24. The opposite ends of the steering support beam 29 are respectively fixed to the pair of A pillars 12.

When the high-pressure gas is introduced to the front airbag module 50, the front airbag module 50 deploys rearward from the module base 53.

The curtain airbag module 61 has a curtain airbag 62 and an inflator 66.

The curtain airbag 62 has a curtain body 63 formed by, for instance, sewing a fabric in the form of a bag that is long in one direction, and also has a protrusion 64 protruding laterally from one end of the curtain body 63.

The protrusion 64 and the front airbag 51 together support the occupant's head, hitting against the front airbag 51, from the front and lateral sides.

The inflator 66 is a small tank that contains gunpowder and high-pressure gas. The inflator 66 is coupled to the curtain airbag 62.

The curtain airbag 62 is disposed along the A pillar 12, the roof rail 15, and the C pillar 14. The protrusion 64 of the curtain airbag 62 is disposed at the A pillar 12. The inflator 66 is fixed to the roof rail 15. When the high-pressure gas is introduced to the curtain airbag module 61, the curtain airbag module 61 deploys downward within the range from the A pillar 12 to the C pillar 14. Furthermore, the protrusion 64 deploys from the curtain body 63 so as to protrude toward the middle of the vehicle body in the width direction.

The controller 71 is, for instance, a microcomputer. The microcomputer has a central processing unit (CPU), a read-only memory (ROM), a random access memory (RAM), an input-output port, and a system bus that couples these components to one another. The ROM stores a program for controlling the operation of the vehicle occupant protection device. The CPU loads this program into the RAM and executes the program. Accordingly, the microcomputer functions as the controller 71 of the vehicle occupant protection device.

The input-output port is coupled to the inflator 52 and various types of detectors. The detectors include, for instance, a vehicle exterior camera 72 that captures an image of the vehicle exterior, such as the front of the vehicle body, from the occupant compartment, a vehicle interior camera 73 that captures an image of the vehicle interior, an acceleration sensor 74, a vehicle speed sensor 75, and a steering angle sensor 76. The controller 71 controls the operation of the vehicle occupant protection device based on input information from these detectors. For instance, the controller 71 controls deployment driving operation of the curtain airbag module 61.

Next, the operation of the vehicle occupant protection device will be described.

Figure 3:
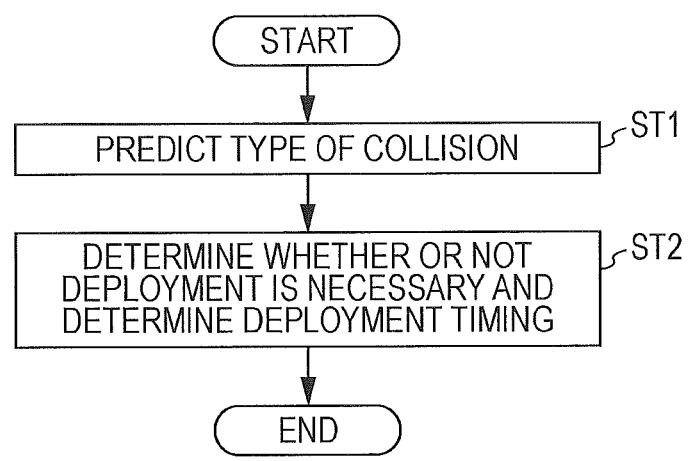
FIG. 3 is a flowchart illustrating the flow of a rotational driving process of an airbag module, which is performed by a controller in FIG. 2.

FIG. 3 is a flowchart illustrating the flow of a rotational driving process of the front airbag module 50, which is performed by the controller 71 in FIG. 2. The controller 71 periodically executes the process in FIG. 3.

In step ST1, the controller 71 predicts and determines, prior to a collision, the type of collision based on input information, which indicates the interior and exterior conditions of the vehicle body, input to the input-output port.

The input information indicating the interior and exterior conditions of the vehicle body includes input information, such as a captured image of the vehicle exterior, to be used for predicting the type of collision, input information at the time of a collision, and input information, such as a captured image of the vehicle interior, indicating the vehicle interior condition.

The type of collision includes, for instance, a full-wrap collision, an offset collision, an oblique collision, and a lateral collision. A full-wrap collision is, for instance, a frontal collision with an oncoming vehicle across the entire vehicle width. An offset collision is, for instance, a frontal collision with an oncoming vehicle in an offset state. An oblique collision is a frontal collision with an oncoming vehicle in a further offset state. In a lateral collision, another automobile 1 collides with a side surface of the vehicle body.

The behavior of the vehicle body and the behavior of an occupant at the time of a collision vary depending on different types of collisions.

Therefore, when predicting and determining the type of collision prior to a collision, the controller 71 first predicts and determines the type of collision based on the input information indicating the interior and exterior conditions of the vehicle body.

For instance, the controller 71 predicts the position and the speed relative to a leading vehicle, an oncoming vehicle, and a structure from the captured image of the vehicle exterior and further predicts the degree of matching between the initial deployment direction of the airbag 51 and the impact input direction as well as the magnitude of an impact value.

Furthermore, the controller 71 predicts the seated position of the occupant as well as the physique or the body weight of the occupant from the captured image of the vehicle interior, and further predicts the degree of matching between the falling direction of the occupant caused by an impact and the initial deployment direction of the airbag 51 as well as the distance between the occupant and an interior component of the vehicle body.

The controller 71 predicts and determines the type of collision in this manner.

The controller 71 may predict and determine the type of collision not only in a normal mode prior to a collision, but also during a collision.

Subsequently, in step ST2, the controller 71 determines whether it is necessary to deploy the front airbag 51 and the protrusion 64 of the curtain airbag 62 based on the predicted type of collision.

For instance, if the predicted type of collision is a full-wrap collision, the controller 71 determines that it is not necessary to deploy the protrusion 64 of the curtain airbag 62.

If the predicted type of collision is an oblique collision, the controller 71 determines that it is necessary to deploy the protrusion 64 of the curtain airbag 62.

In a case where it is necessary to deploy the protrusion 64 of the curtain airbag 62, the controller 71 determines the deployment timing of the curtain airbag 62. In accordance with, for instance, the occupant's physique and the vehicle speed, the controller 71 calculates the timing for outputting an ignition signal to the inflator 66 of the curtain airbag 62 such that the protrusion 64 of the curtain airbag 62 is deployed at the outer side of the front airbag 51 at the timing at which the fallen occupant reaches the front airbag 51.

This deployment timing may be calculated as, for instance, a time difference relative to the timing at which an ignition signal is output to the inflator 52 of the front airbag module 50. The time it takes for the curtain airbag 62 to be fully deployed from the start of the deployment process is generally longer than that of the front airbag 51. In this case, the controller 71 calculates a time difference that causes the curtain airbag 62 to be deployed earlier than the front airbag 51 at the time of the collision prediction.

In addition to determining prior to a collision whether it is necessary to deploy the protrusion 64 of the curtain airbag 62 in this manner, the controller 71 determines the occurrence of a collision by performing a collision determination process different from the process in FIG. 3.

In this collision determination process, the controller 71 determines the occurrence of a collision based on various types of detection information input to the input-output port.

Then, when a collision occurs, the controller 71 outputs an ignition signal to the inflator 52. The controller 71 adjusts the timing for outputting the ignition signal to the inflator 52 so that the occupant hits against the front airbag 51 at a timing at which the front airbag 51 deploys to its maximum size or at a timing immediately before or after that timing.

When the inflator 52 receives the ignition signal, the front airbag module 50 ignites the gunpowder so that the high-pressure gas is blown into the front airbag 51. This causes the front airbag 51 to deploy. The front airbag 51 starts to deploy as the high-pressure gas begins to flow therein, and subsequently reaches its maximum size. When the internal pressure further increases, the front airbag 51 starts to release the gas therefrom so as to deflate. The occupant hits against this deployed front airbag 51 so that the occupant can be protected, as compared with a case where the occupants hits against, for instance, an interior component.

Furthermore, in a case where it is determined that it is necessary to deploy the protrusion 64 of the curtain airbag 62 at the time of the prediction, the controller 71 outputs an ignition signal to the inflator 66 of the curtain airbag module 61 in the aforementioned time difference with reference to the timing for starting the deployment of the front airbag 51. This causes the curtain airbag 62 to deploy. Consequently, the protrusion 64 of the curtain airbag 62 is deployed at the outer side of the front airbag 51 during or after the deployment thereof.

Accordingly, for instance, assuming that the occupant seated on the navigation seat 24 hits against the front airbag 51 while leaning toward the outer side, the protrusion 64 can support the outer surface of the head hitting against the front airbag 51. With the front airbag 51 and the protrusion 64, the head of the occupant hitting against the front airbag 51 can be supported from the front and lateral sides.

As described above, in this example, when an impact is received obliquely from the front side, such as in the event of an oblique collision, the curtain airbag 62 is deployed at the timing at which the occupant leaning outward comes into contact with the front airbag 51, and the protrusion 64 is deployed at the outer side of the front airbag 51 during or after the deployment thereof. Thus, the outer surface of the occupant hitting against the front airbag 51 can be supported by the protrusion 64. Consequently, after hitting against the front airbag 51, the head of the occupant leaning outward is less likely to move sideways in an offset manner from the front airbag 51.

After hitting against the front airbag 51, the head of the occupant leaning outward rotates when moving sideways in an offset manner from the front airbag 51 while still being in contact with the front airbag 51. If this rotation is large and quick, the brain tends to rotate slower than the rotation of the head. In this example, the occurrence of such a situation can be effectively suppressed.

In particular, in this example, the protrusion 64 deploys at the outer side of the front airbag 51 to a position located closer toward the middle of the vehicle body relative to the outer edge of the deployed front airbag 51. The front section of the protrusion 64 comes into contact with the outer surface of the deployed front airbag 51, and the rear section of the protrusion 64 extends rearward from the area thereof in contact with the outer surface of the front airbag 51. By causing the protrusion 64 to deploy to the inner side relative to the outer edge of the deployed front airbag 51 and also causing the protrusion 64 to come into contact with the outer surface of the front airbag 51, sagging of the front airbag 51 may be suppressed. This also makes these components function as if they are a single airbag 51. With a corner defined by the protrusion 64 and the front airbag 51, which are combined by being in contact with each other, the front and outer surfaces of the head can be supported.

Although the above-described example is a preferred example of the present invention, the example is not limited thereto, and various modifications or alterations are permissible so long as they do not depart from the scope of the invention.

For instance, in the above-described example, the curtain airbag 62 is provided with the protrusion 64.

Alternatively, for instance, a side airbag may be used as the airbag that is to be deployed at the outer side of the occupant. The protrusion 64 may be provided in this side airbag.

The invention claimed is:

1. A vehicle occupant protection device, comprising:
   a front airbag that is provided in a vehicle body and configured to deploy in front of an occupant occupying the vehicle body so that at least a head of the occupant hits against the front airbag;
   a lateral airbag that is provided in the vehicle body and configured to deploy at a lateral side of the occupant;
   a controller that controls deployment of the lateral airbag; and
   a plurality of detectors that provide information on interior and exterior conditions of the vehicle body to the controller,
   wherein the lateral airbag has a protrusion that is configured to deploy toward a middle of the vehicle body in a width direction,
   wherein the protrusion is configured to be deployed together with the front airbag at an outer side of the front airbag at least when an impact is input obliquely from a front side,
   wherein the protrusion has a front section and a rear section, the front section being configured to come into contact with an outer edge of the front airbag by deploying to a position located closer toward the middle of the vehicle body relative to an outer edge of the front airbag in a deployed state so as to come into contact with the outer edge of the front airbag of the front airbag in the deployed state, the rear section being located to the rear of the front section and extending further rearward than the front airbag,
   wherein, based on the information provided by detectors, the controller calculates a time difference that causes the lateral airbag to be deployed earlier than the front airbag in a case where it is necessary to deploy the protrusion,
   wherein the protrusion is configured to be deployed together with the front airbag so that the head of the occupant whose front side hits against the front airbag is supported from a lateral side with the rear section extending rearward from the front section in contact with the outer edge of the front airbag, and
   wherein, based on the time difference, the controller deploys the protrusion at a timing which the head of the occupant hits against the front airbag.

2. The vehicle occupant protection device according to claim 1, wherein the controller determines a type of collision based on at least one of input information to be used for predicting the type of collision, input information at a time of a collision, or the information indicating the vehicle interior condition, determines whether deployment of the protrusion is necessary based on a determination result of the type of collision, and causes the lateral airbag to deploy if the deployment of the protrusion is necessary.

3. The vehicle occupant protection device according to claim 2, wherein, when determining the type of collision, the controller determines at least one of a degree of matching between a deployment direction of the front airbag and an impact input direction, a degree of matching between a falling direction of the occupant caused by an impact and the deployment direction of the front airbag, a magnitude of an impact value, one of presence and absence of the occupant, a magnitude of one of a physique and a body weight of the occupant, and a distance between the occupant and an interior component of the vehicle body.

4. The vehicle occupant protection device according to claim 3, wherein the controller causes the lateral airbag to deploy earlier than the front airbag at a time of a collision prediction.

5. The vehicle occupant protection device according to claim 3, wherein the controller predicts and determines the collision type during a collision.

6. The vehicle occupant protection device according to claim 5, wherein the controller determines whether it is necessary to deploy the front airbag and the protrusion of the lateral airbag based on the predicted type of collision.

7. The vehicle occupant protection device according to claim 3, wherein the controller predicts and determines the collision type during a normal mode prior to collision.

8. The vehicle occupant protection device according to claim 7, wherein the controller determines whether it is necessary to deploy the front airbag and the protrusion of the lateral airbag based on the predicted type of collision.

9. The vehicle occupant protection device according to claim 1, wherein the lateral airbag comprises one of a curtain airbag and a side airbag provided in the vehicle body.

10. A vehicle occupant protection device, comprising:
    a front airbag that is provided in a vehicle body and configured to deploy in front of an occupant occupying the vehicle body so that at least a head of the occupant hits against the front airbag;
    a lateral airbag that is provided in the vehicle body and configured to deploy at a lateral side of the occupant;
    a controller that controls deployment of the lateral airbag; and
    a plurality of detectors that provide information on interior and exterior conditions of the vehicle body to the controller,
    wherein the lateral airbag includes a protrusion that is configured to deploy toward a middle of the vehicle body in a width direction,
    wherein the protrusion is configured to be deployed together with the front airbag at an outer side of the front airbag at least when an impact is input obliquely from a front side,
    wherein the protrusion has a front section and a rear section, the front section being configured to come into contact with an outer edge of the front airbag by deploying to a position located closer toward the middle of the vehicle body relative to an outer edge of the front airbag in a deployed state so as to come into contact with the outer edge of the front airbag of the front airbag in the deployed state, the rear section being located to the rear of the front section and extending further rearward than the front airbag,
    wherein the protrusion is configured to be deployed together with the front airbag so that the head of the occupant whose front side hits against the front airbag is supported from a lateral side with the rear section extending rearward from the front section in contact with the outer edge of the front airbag, and wherein, based on the information provided by detectors, the controller deploys the protrusion at a timing which the head of the occupant hits against the front airbag.

* * * * *